(12) United States Patent
Nomura et al.

(10) Patent No.: US 6,563,896 B1
(45) Date of Patent: May 13, 2003

(54) DIGITAL BROADCAST RECEIVER AND RECEIVING METHOD

(75) Inventors: Kiyoshi Nomura, Kanagawa (JP); Shigeru Kaneko, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/365,796

(22) Filed: Aug. 3, 1999

(30) Foreign Application Priority Data

Aug. 4, 1998 (JP) ............................................ 10-220621

(51) Int. Cl.[7] ................................................ H04L 7/06
(52) U.S. Cl. ........................................ 375/364; 370/465
(58) Field of Search ................................ 370/203, 206, 370/210, 310, 328, 330, 335, 342, 441, 449, 464, 465; 375/130, 140–142, 147, 150, 316, 340–344, 354

(56) References Cited

U.S. PATENT DOCUMENTS

| | | | | |
|---|---|---|---|---|
| 5,602,835 A | * | 2/1997 | Seki et al. ................ | 370/206 |
| 5,694,389 A | * | 12/1997 | Seki et al. ................ | 370/208 |
| 5,774,450 A | * | 6/1998 | Harada et al. ............ | 370/206 |
| 5,787,123 A | * | 7/1998 | Okada et al. ............. | 370/203 |
| 5,818,813 A | * | 10/1998 | Saito et al. .............. | 370/208 |
| 6,047,034 A | * | 4/2000 | Tsuruoka ................. | 375/343 |
| 6,108,353 A | * | 8/2000 | Nakamura et al. ....... | 370/208 |
| 6,208,695 B1 | * | 3/2001 | Klank et al. ............. | 375/260 |

FOREIGN PATENT DOCUMENTS

| | | | | |
|---|---|---|---|---|
| EP | 0653858 | 11/1994 | ............ | H04L/5/06 |
| EP | 0843431 | 5/1998 | ............ | H04H/1/00 |
| JP | 9307599 | 11/1997 | ............ | H04L/27/22 |

* cited by examiner

*Primary Examiner*—Hassan Kizou
*Assistant Examiner*—David Odland
(74) *Attorney, Agent, or Firm*—Jay H. Maioli

(57) ABSTRACT

A digital broadcast receiver for determining the actual transmission mode of a Digital Audio Broadcast (DAB) signal with a delay circuit for delaying a received DAB signal is provided. With a correlation circuit for correlating a delay output of the delay circuit with the received DAB signal a moving average circuit for calculating a moving average of a correlation output of the correlation circuit. A transmission mode is assumed to be one of a plurality of transmission modes. The delay time of the delay circuit is set at a time corresponding to a symbol time length of the assumed transmission mode. The number of times that the output of the moving average circuit exceeds a prescribed value is counted. Based on counting results, the actual transmission mode is identified based on the maximum number of times that the output of the moving average circuit exceeds the prescribed value.

10 Claims, 6 Drawing Sheets

FIG. 2

| TRANSMISSION MODE | TF | n | TS | TG, TE |
|---|---|---|---|---|
| I | 96ms | 76 | 1246μs | 246μs |
| II | 24 | 76 | 312 | 62 |
| III | 24 | 153 | 156 | 31 |
| IV | 48 | 76 | 623 | 123 |

DIGITAL BROADCAST RECEIVER AND RECEIVING METHOD

BACKGROUND OF THE INVENTION

1. Field of the Invention

The present invention relates to a receiver of digital broadcasting such as digital audio broadcasting.

2. Description of the Related Art

In Europe, the DAB (digital audio broadcasting according to the Eureka 147 standard) is now in operation. In the DAB, a plurality of digital data are subjected to various encoding processes and finally converted to an OFDM (orthogonal frequency division multiplexing) signal, which is transmitted. Digital data such as digital audio data of up to 64 channels (maximum case) can be broadcast simultaneously.

FIG. 1(A) shows a time-axis structure of the OFDM signal. The OFDM signal is a plurality of continuous frames, and each frame consists of a plurality of symbols. The DAB has four transmission modes, that is, modes I–IV. The frame time length TF and the maximum number n of symbols in each frame of each transmission mode are as shown in FIG. 2.

Each frame is divided into a synchronization channel SC, a fast information channel FIC, and a main service channel MSC with a symbol serving as a unit of data. The synchronization channel SC, which is used for processes such as frame synchronization and AFC (automatic frequency control) in a receiver, consists of two symbols in which the first symbol is a null symbol Null and the second symbol is a phase reference symbol TFPR. The null symbol Null in every other frame includes identification information TII for identification of a transmission facility and no information is transmitted (no carrier signal is transmitted) during the other null symbol Null periods (every other frame).

In the fast information channel FIC, which provides data relating to the main service channel MSC and other data, data such as time, a date, a type, a data arrangement, and a traffic message control are arranged. In the main service channel MSC, digital audio data as main data and various kinds of digital data are arranged.

Further, as shown in FIG. 1(B), each symbol is configured in such a manner that a head period TG having a prescribed length is a guard period (also called a guard interval) that follows the preceding symbol and the remaining period is a data period of effective symbols. The contents of the period TG are the same as the contents of a tail period TE of the same symbol. Therefore, the periods TG and TE have the same length. The symbol time length TS and the length of the guard period TG of each transmission mode are as shown in FIG. 2.

As described above, the DAB has four transmission modes, that is, modes I–IV. One method for judging a transmission mode is a method of correlating a received phase reference symbol TFPR with another phase reference symbol TFPR that is prepared in advance and evaluating a correlation result.

However, in the case of this method in order to extract a phase reference symbol TFPR from a received signal, it is required that a rough sync is extracted from the received signal in a suitable timing. The rough sync is a synchronization signal of low precision that controls demodulation timing or the like. Further, since the phase reference symbol TFPR immediately follows the null symbol Null, there may occur an event that an attempt of extracting a phase reference symbol TFPR correctly and evaluating it results in a failure because a level of the TFPR symbol is influenced by AGC depending on the state of radio waves, for example, in a high field strength situation.

Still further, since only one phase reference symbol TFPR exists in each frame, one frame period is needed for each evaluation attempt and hence the transmission mode judgment takes a long time.

SUMMARY OF THE INVENTION

The present invention has been made to solve the above problems in the art, and an object of the invention is therefore to make it possible to judge a transmission mode quickly and reliably in a DAB receiver.

According to a first aspect of the invention, there is provided a digital broadcast receiver for receiving a digital signal that was transmitted in one of a plurality of transmission modes having different symbol time lengths and in which each symbol includes two signal intervals having the same period, comprising a delay circuit for delaying a received digital signal by a prescribed period; a correlation circuit for correlating a delay output of the delay circuit with the received digital signal; a moving average circuit for calculating a moving average of a correlation output of the correlation circuit over a period that is equal to the period of the two signal intervals; means for assuming a transmission mode to be one of the plurality of transmission modes in order; means for setting a delay time of the delay circuit to a time corresponding to the symbol time length of each assumed transmission mode; means for counting, for each assumed transmission mode, the number of times that an output of the moving average circuit exceeds a predetermined value; and means for judging, based on counting results of the counting means, that a transmission mode that gives a maximum number of times that the output of the moving average circuit exceeds the predetermined value is an actual transmission mode.

The count value becomes largest when the assumed transmission mode coincides with the actual transmission mode. Therefore, the assumed transmission mode giving the maximum count value is judged to be the actual transmission mode.

According to a second aspect of the invention, there is provided a digital broadcast receiver for receiving a digital signal that was transmitted in one of a plurality of transmission modes having different symbol time lengths and in which each symbol includes two signal intervals having the same period, comprising a delay circuit for delaying a received digital signal by a prescribed period; a correlation circuit for correlating a delay output of the delay circuit with the received digital signal; a moving average circuit for calculating a moving average of a correlation output of the correlation circuit over a period that is equal to the period of the two signal intervals; a peak detection circuit for detecting a temporal position of a peak of an output signal of the moving average circuit; means for assuming a transmission mode to be one of the plurality of transmission modes in order; means for setting a delay time of the delay circuit to a time corresponding to the symbol time length of each assumed transmission mode; means for judging an actual transmission mode based on an interval between peak temporal positions detected by the peak detection circuit.

BRIEF DESCRIPTION OF THE DRAWINGS

FIG. 2 is a table showing parameter values of each transmission mode of the DAB;

DETAILED DESCRIPTION OF THE PREFERRED EMBODIMENT

Figure 3:
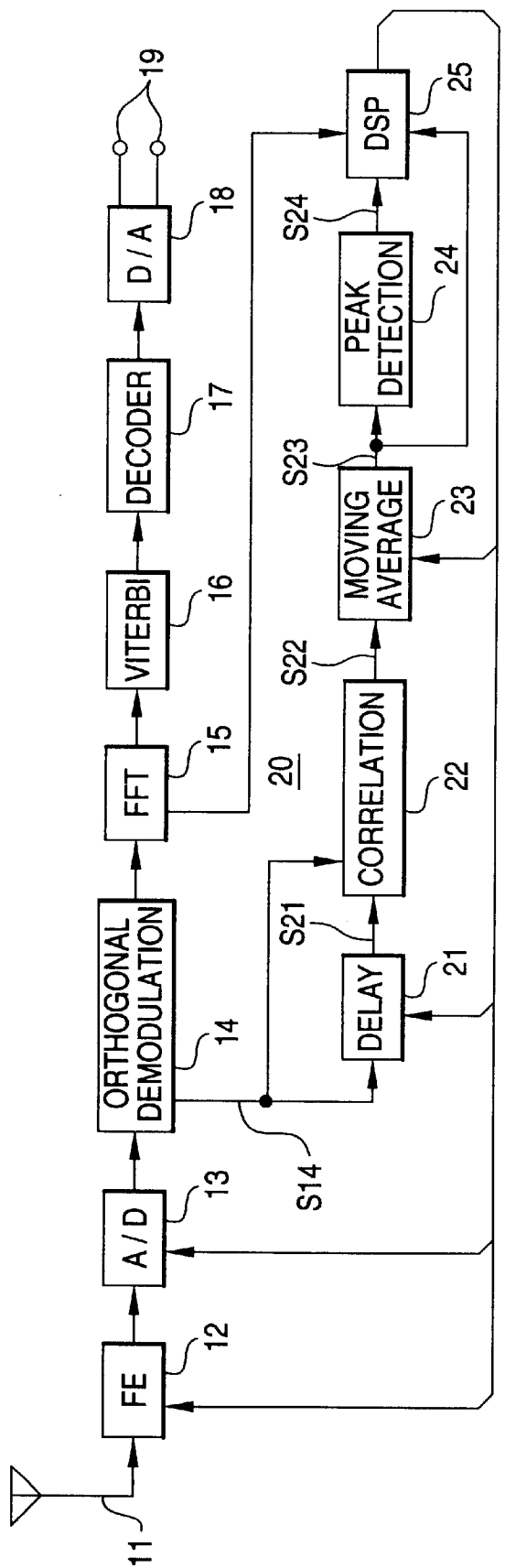
FIG. 3 is a block diagram showing a receiver according to an embodiment of the present invention.

FIG. 3 is a block diagram showing a receiver according to an embodiment of the present invention.

As shown in FIG. 3, a DAB broadcast wave signal is received by an antenna 11. A reception signal is supplied to a front end circuit 12 having a superheterodyne configuration, where it is frequency-converted to a baseband signal. The baseband signal is supplied to an A/D converter circuit 13, where it is converted to a digital signal.

The digital signal is supplied to an orthogonal demodulator 14, where it is demodulated into in-phase component (real-axis component) data and orthogonal component (imaginary-axis component) data, which are subjected to complex Fourier transform in an FFT circuit 15 and frequency components are output on a symbol-by-symbol basis. The output of the FFT circuit 15 is supplied to a Viterbi decoding circuit 16, where it is subjected to deinterleaving and error correction as well as program (channel) selection, whereby digital audio data of a desired program is selected.

Then, the selected data is supplied to a decoder circuit 17, where it is subjected to MPEG data expansion. The digital audio data of the desired program as expanded to the original data length that is output from the decoder circuit 17 is supplied to a D/A converter circuit 18, where it is D/A-converted to an analog audio signal, which is output from terminals 19.

A synchronization circuit 20 is configured as follows. An in-phase/orthogonal component signal S14 that is output from the orthogonal demodulator 14 is supplied to a delay circuit 21, where it is converted to a signal S21 that is delayed by a period TS–TE, for example (see FIGS. 4(A) and 4(B)). The delay signal S21 is supplied to a correlation circuit 22 together with the original signal S14.

Figure 1:
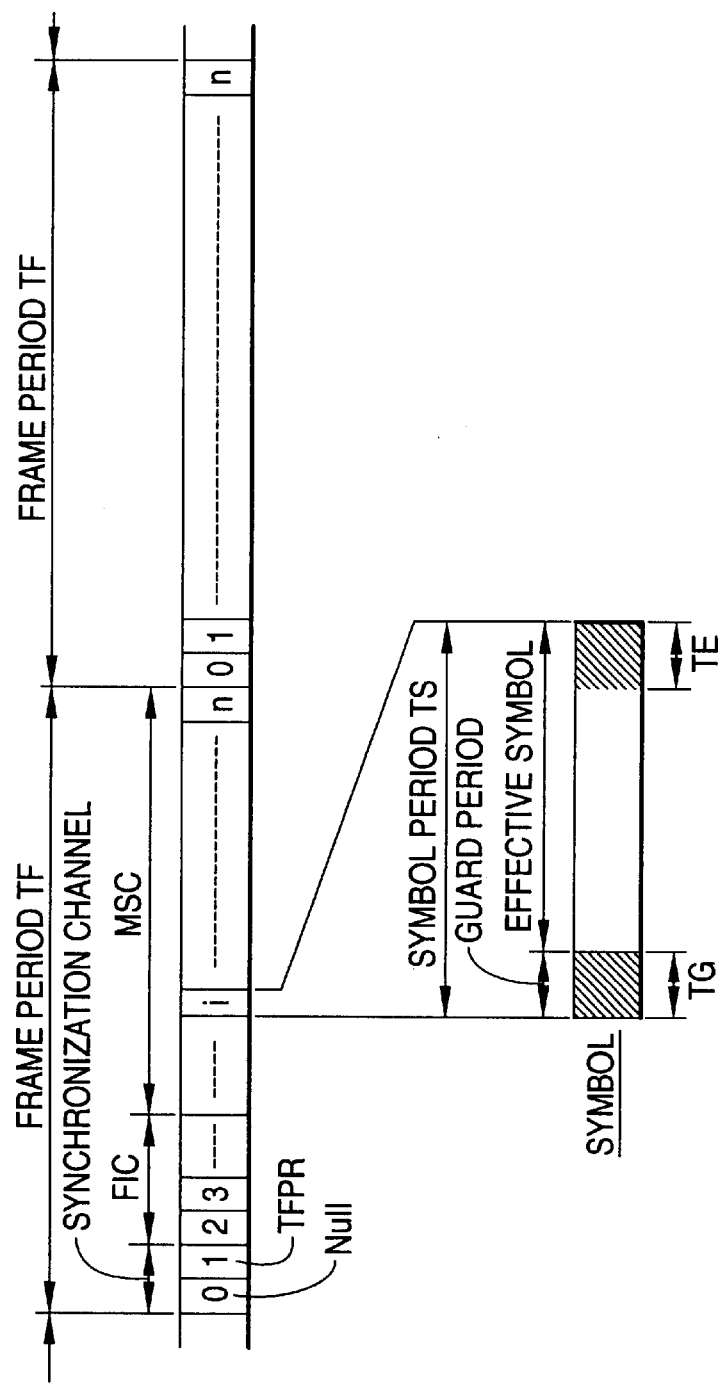
FIGS. 1(A) and 1(B) show a time-axis structure of the OFDM signal.
Figure 4:
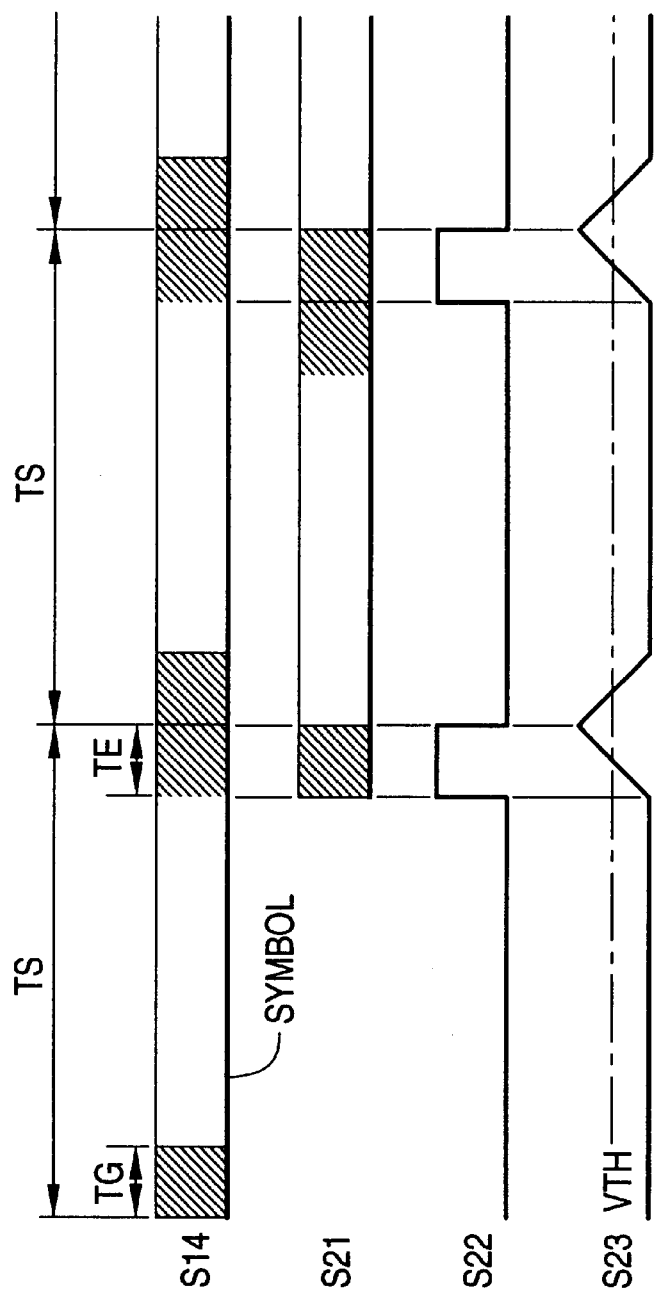
FIGS. 4(A)–4(D) are a time chart showing relationships between signals in the receiver of FIG. 3.

As a result, as shown in FIGS. 4(A) and 4(B), the temporal position of the period TE of a certain symbol of the signal S14 coincides with that of the period TG of the same symbol of the signal S21. Further, as described above in connection with FIGS. 1(A) and 1(B), the contents of the period TG is the same as the contents of the period TE. Therefore, the correlation between the signals S14 and S21 is high in the period TE of the signal S14 and low in the other periods. As a result, as shown in FIG. 4(C), an output signal S22 of the correlation circuit 22 has a high level in the period TE of the signal S14 and has a low level in the other periods.

The signal S22 is supplied to a moving average circuit 23, where a moving average is calculated for a signal portion present for a time equal to the period TG. As shown in FIG. 4(D), the moving average circuit 23 is effectively an integrator that outputs a signal S23 that gradually increases in the period TE of the signal S14 and gradually decreases in a similar period thereafter. The signal S23 is supplied to a peak detection circuit 24, where the temporal position of its peak is detected. As seen from FIGS. 4(A)–4(D), the peak temporal position of the signal S23 coincides with the end point of the period TE of the signal S14, that is, the end point of the symbol of the signal S14. That is, a plurality of symbols continue in the signal S14 and an output signal S24 of the peak detection circuit 24 indicates the boundary points between those continuous symbols. Therefore, the DAB transmission mode can be judged based on the period from each boundary point and the next boundary point.

A frequency analysis result of the phase reference symbol TFPR is output from the FFT circuit 15 and input to a DSP 25. In the DSP 25, the sampling time point of the A/D conversion in the A/D converter circuit 13 is corrected based on the data of the frequency analysis result and frame synchronization is thereby taken. Further, data indicating the magnitude of a frequency offset is determined based on the data of the frequency analysis result and the signal S24. The local oscillation frequency of the front end circuit 12 is controlled based on the resulting data, whereby the frequency offset of the signal that is output from the front end circuit 12 is corrected. AFC is thus effected.

Figure 5:
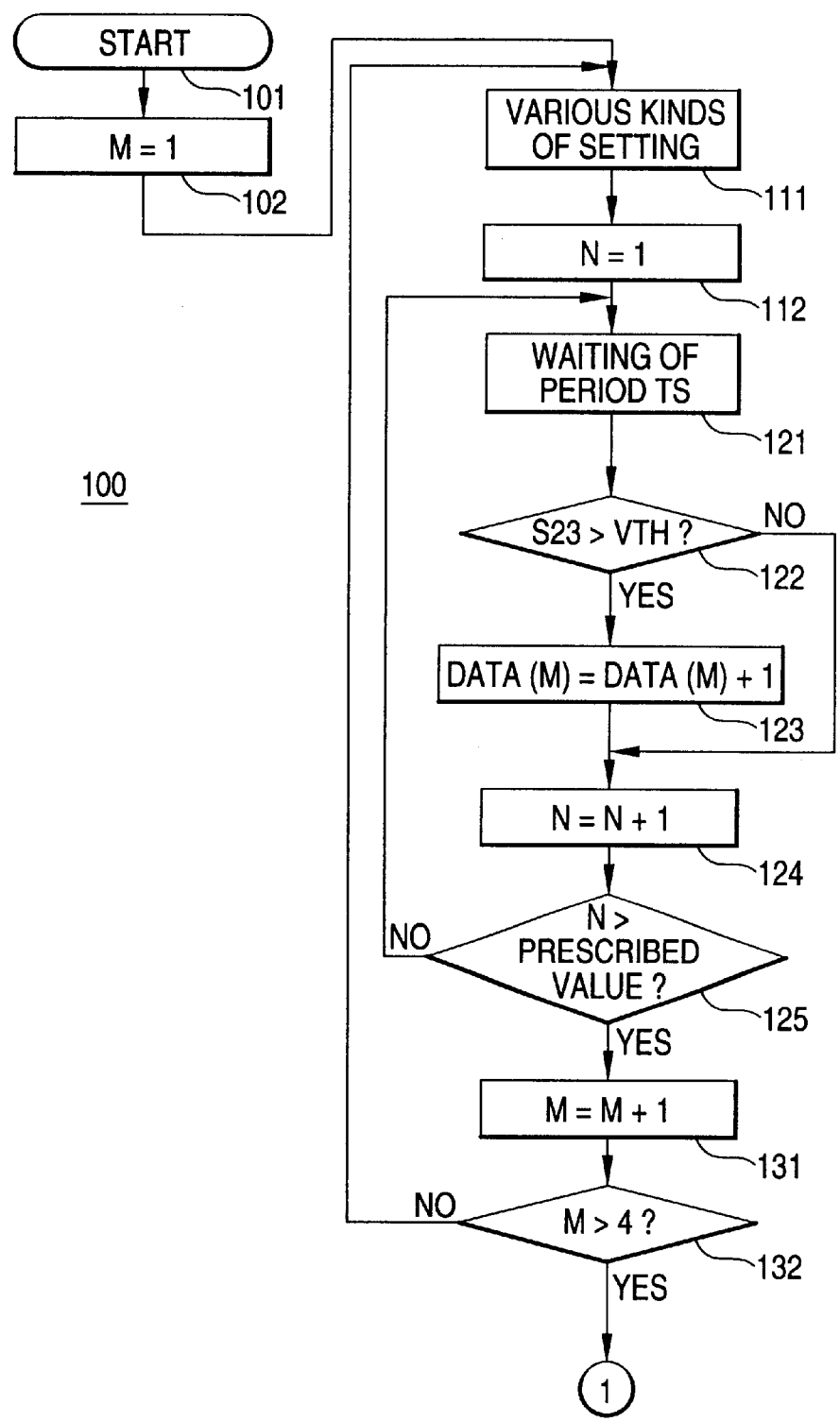
FIGS. 5 and 6 are flowcharts showing a process that is executed by the receiver of FIG. 3.
Figure 6:
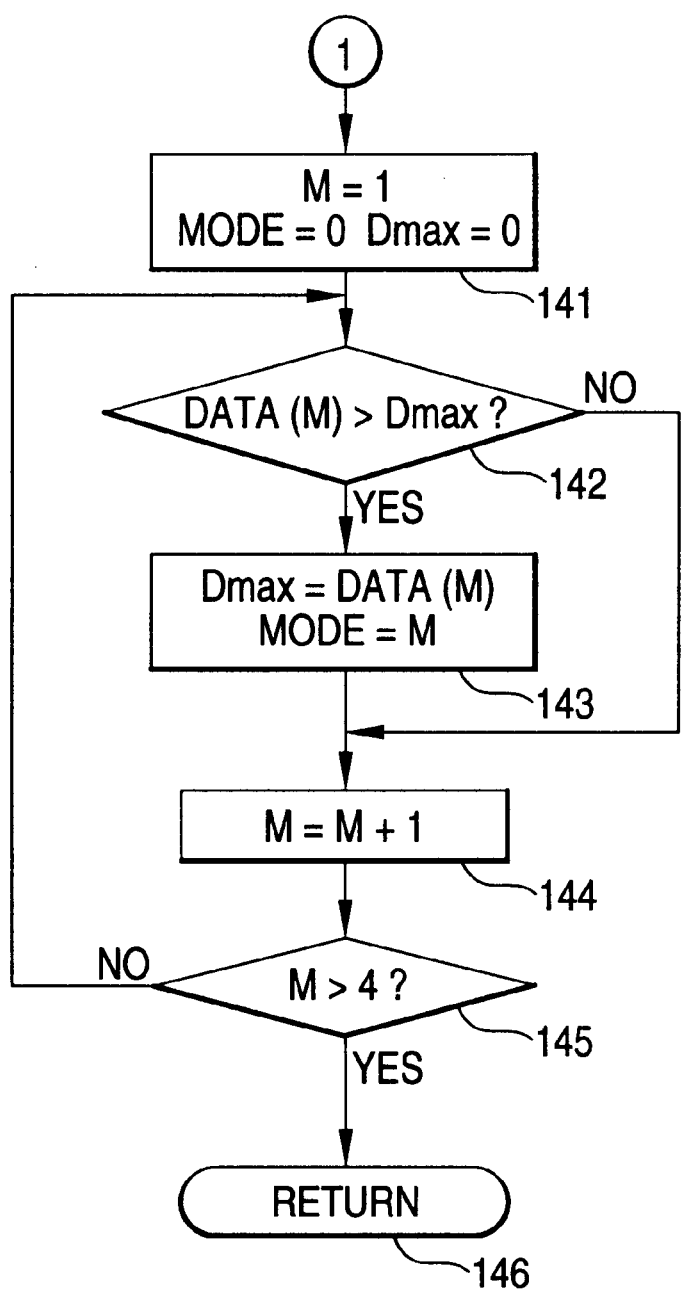

An ordinary receiving process is continued in the above manner. In the invention, at the time of station selection, for example, a judgment routine 100 shown in FIGS. 5 and 6 is executed in the DSP 25, whereby a judgment is made as to which of modes I–IV the DAB transmission mode is.

Now, the delay time in the delay circuit 21 is represented by TD. If a relationship $$TD=TS-TE$$

holds, the level of the moving average signal S23 becomes large in the period TE of the signal S14. However, if the delay time TD is much different from the time TS–TE, the period TE portion of the signal S14 does not coincide with the period TG portion of the signal S21 and the level of the moving average signal S23 remains low.

As shown in FIG. 2, the symbol period TS greatly varies with the transmission mode.

In view of the above, in the routine 100, the delay time TD in the delay circuit 21 is changed in order in the following manner:

(1) the delay time TD is set at the time TS–TE of the transmission mode I;

(2) the delay time TD is set at the time TS–TE of the transmission mode II;

(3) the delay time TD is set at the time TS–TE of the transmission mode III; and (4) the delay time TD is set at the time TS–TE of the transmission mode IV.

Further, the level of the moving average signal S23 is checked for each of cases (1)–(4) and the transmission mode is judged based on check results.

The routine 100 starts at step 101. At step 102, variable M is set at 1. Variable M indicates an assumed transmission mode. Since M is equal to 1 in this state, the following process will be executed with an assumption that the transmission mode is mode I.

Then, the process goes to step 111, where the delay time TD of the delay circuit 21 is set at a time TS–TE corresponding to the transmission mode indicated by variable M. Since M is equal to 1 in this state, the delay time TD of the delay circuit 21 is set at 1 ms (=1.246 ms–246 $\mu$s) that corresponds to the transmission mode I.

Further, at step 111, the time of a portion of the signal for which a moving average is calculated by the moving average circuit 23 is set to the period TG that corresponds to the transmission mode indicated by variable M and a threshold level VTH (see FIG. 4(D)) in the moving average circuit 23, which operates as an integrator as shown in FIG. 4(D), is set at a value that corresponds to the transmission mode indicated by variable M. The reason why setting is made in the above manner is that the time length over which a moving average is calculated by the moving average circuit 23 varies with the transmission mode that is indicated by variable M and hence the peak value of the signal S23 varies with the transmission mode. Further, variable DATA(M) is cleared to 0 at step 111.

Then, the process goes to step 112, where variable N is set at 1. As will be understood from a description made later, variable N is incremented by one for each symbol period TS.

Then, the process goes to step 121, where waiting is performed for a time length that is equal to the symbol period TS that corresponds to the assumed transmission mode indicated by variable M. If the period TE of the next symbol of the signal S23 is reached as a result of the waiting, the process goes to step 122, where it is judged whether the level of the signal S23 is higher than the prescribed value VTH.

If the assumed transmission mode indicated by variable M coincides with the actual transmission mode, a relationship S23>VTH is established in the period TE because the delay time TD of the delay circuit 21 is equal to the period TS−TE of the actual transmission mode. However, if the assumed transmission mode indicated by variable M does not coincide with the actual transmission mode, a relationship S23≦VTH holds because the delay time TD of the delay circuit 21 deviates from the period TS−TE of the actual transmission mode.

Therefore, if S23>VTH, the process goes from step 122 to step 123, where the value of variable DATA(M) is incremented by one.

At step 124, variable N is incremented by one. Then, the process goes to step 125, where it is judged whether the value of variable N has exceeded a prescribed value. If the judgment result is negative, the process returns from step 125 to step 121.

Steps 121–125 are repeated thereafter for each symbol period TS until the value of variable N reaches the prescribed value. In those repetitive operations, the value of variable DATA(M) is incremented by one if S23>VTH. Therefore, the number of times that the assumed transmission mode coincides with the actual transmission mode is counted as variable DATA(M) in the prescribed number of continuous symbol periods. In this state, the number of times that the assumed transmission mode, that is, mode I, coincides with the actual transmission mode is counted as variable DATA(1).

When steps 121–125 have been executed for the prescribed number of symbol periods, the value of variable N exceeds the prescribed number. Therefore, the process goes from step 125 to step 131, where variable M that indicates the assumed transmission mode is incremented by one. At the next step 132, it is judged whether a relationship M>4 holds. If M≦4, the process returns from step 132 to step 111.

Thereafter, operations similar to the above are performed in order for cases in which the transmission mode is assumed to be mode II, mode III, and mode IV, respectively. The numbers of events that the assumed transmission mode coincides with the actual transmission mode are counted as variables DATA(2)–DATA(4).

When all the operation for the case in which the transmission mode is assumed to be mode IV has finished, M is set at 5 at step 131. This is detected at step 132 and the process goes from step 132 to step 141 (see FIG. 6). At step 141, variable M is again set at 1 and variables MODE and Dmax are set at 0. Variable MODE is to store data indicating a mode that has been determined by the routine 100 and variable Dmax is to output the maximum value among the values of variables DATA(1)–DATA(4).

Then, at step 142, it is judged whether a relationship DATA(M)>Dmax holds. If DATA(M)>Dmax, the process goes from step 142 to step 143. At step 143, the value of variable DATA(M) in this state is copied to variable Dmax and the value of variable M is copied to variable MODE. Then, the process goes to step 144. If DATA(M)≦Dmax at step 142, the process goes from step 142 to step 144 skipping step 143.

At step 144, variable M is incremented by one. Then, at step 145, it is judged whether a relationship M>4 holds. If M≦4, the process returns to step 142.

Therefore, as a result of execution of steps 142–145, the value of variable Dmax becomes equal to the maximum value among the values of variables DATA(1)–DATA(4). The value of variable MODE becomes equal to the value of variable M that gives variable DATA(M) having the maximum value. Therefore, variable MODE indicates a transmission mode that gives the maximum number of events that the assumed transmission mode was judged coincident with the actual transmission mode, and hence indicates a transmission mode judgment result.

When the above operation has been finished with M reaching 4, M becomes 5 as a result of execution of step 144. This is detected at step 145, and the process goes from step 145 to step 146 to complete the execution of the routine 100.

In the above manner, the routine 100 enables judgment of a transmission mode. Data indicating a determined transmission mode is stored as variable MODE. Therefore, by setting necessary portions of the receiver in accordance with variable MODE, a DAB signal can be received correctly thereafter.

In the above-described receiver, in particular, transmission modes are assumed and among those assumed modes a transmission mode that gives the maximum number of events that the relationship S23>VTH is satisfied is regarded as an actual transmission mode. Therefore, synchronization is not required unlike the case where a received phase reference symbol TFPR is correlated with another phase reference signal TFPR prepared in advance and a correlation result is evaluated.

Further, since the signal S23 is obtained from a symbol having a short repetition cycle TS, a transmission mode can be judged in a short time and hence the judgment is less prone to be influenced by fading, a Doppler effect, a weak electric field, etc.

The above embodiment may be modified in such a manner that a baseband signal from the front end circuit 12 is demodulated into an in-phase component and an orthogonal component, which are A/D-converted and then supplied to the FFT circuit 15.

According to the invention, synchronization is not required in judging a transmission mode. Further, the transmission mode judgment can be performed in a short time and hence the judgment is less prone to be influenced by fading, a Doppler effect, a weak electric field, etc.

What is claimed is:

1. A digital broadcast receiver for receiving a digital signal transmitted in one of a plurality of transmission modes having different respective symbol time lengths and in which each symbol includes two signal intervals with equal periods, comprising:

a delay circuit for delaying a received digital signal by a prescribed period;

a correlation circuit for correlating a delay output of the delay circuit with the received digital signal;

a moving average circuit for calculating a moving average of a correlation output of the correlation circuit over a period that is equal to the period of the two signal intervals;

selecting means for selecting at least one assumed transmission mode from the plurality of transmission modes chosen in a predetermined order;

setting means for setting a delay time of the delay circuit to a time corresponding to the symbol time length of each selected transmission mode;

counting means for counting, for each assumed transmission mode, the number of times an output of the moving average circuit exceeds a predetermined value; and judging means for judging, based on counting results of the counting means, that a transmission mode that gives a maximum number of times that the output of the moving average circuit exceeds the predetermined value is an actual transmission mode of said plurality of transmission modes.

2. The digital broadcast receiver according to claim 1, wherein the digital signal is based on a Digital Audio Broadcasting scheme.

3. A digital broadcast receiver for receiving a digital signal transmitted in one of a plurality of transmission modes having different respective symbol time lengths and in which each symbol includes two signal intervals with equal periods, comprising:

a delay circuit for delaying a received digital signal by a prescribed period;

a correlation circuit for correlating a delay output of the delay circuit with the received digital signal;

a moving average circuit for calculating a moving average of a correlation output of the correlation circuit over a period that is equal to the period of the two signal intervals;

a peak detection circuit for detecting a temporal position of a peak of an output signal of the moving average circuit;

selecting means for selecting at least one transmission mode from the plurality of transmission modes chosen in a predetermined order;

setting means for setting a delay time of the delay circuit to a time corresponding to the symbol time length of each selected transmission mode;

identifying means for identifying an actual transmission mode based on an interval between peak temporal positions detected by the peak detection circuit.

4. The digital broadcast receiver according to claim 3, wherein the digital signal is based on a Digital Audio Broadcasting scheme.

5. The digital broadcast receiver according to claim 3, further comprising counting means for counting, for each assumed transmission mode, the number of times an output of the moving average circuit exceeds a predetermined value, wherein the identifying means identifies the actual transmission mode based on counting results of the counting means and the interval between the peak temporal positions detected by the peak detection circuit.

6. The digital broadcast receiver according to claim 5, wherein the digital signal is based on a Digital Audio Broadcasting scheme.

7. A digital broadcast receiving method for receiving a digital signal transmitted in one of a plurality of transmission modes having different respective symbol time lengths and in which each symbol includes two signal intervals with equal periods, comprising the steps of:

selecting at least one assumed transmission mode from the plurality of transmission modes;

delaying a received digital signal by a prescribed period corresponding to the selected transmission mode;

correlating a delay output with the received digital signal;

calculating a moving average of a correlation output over a period that is equal to the period of the two signal intervals;

counting the number of times a moving average output exceeds a predetermined value; and judging, after the preceding steps have been executed for the plurality of transmission modes chosen in a predetermined order, that a transmission mode that gives a maximum number of times that the moving average output exceeds the predetermined value among counting results for the plurality of transmission modes is an actual transmission mode of said plurality of transmission modes.

8. The digital broadcast receiving method according to claim 7, wherein the digital signal is based on a Digital Audio Broadcasting scheme.

9. A digital broadcast receiving method for receiving a digital signal transmitted in one of a plurality of transmission modes having different respective symbol time lengths and in which each symbol includes two signal intervals with equal periods, comprising the steps of:

selecting at least one assumed transmission mode from the plurality of transmission modes;

delaying a received digital signal by a prescribed period corresponding to the selected transmission mode;

correlating a delay output with the received digital signal;

calculating a moving average of a correlation output over a period that is equal to the period of the two signal intervals;

detecting a temporal position of a peak of a moving average output; and identifying, after the preceding steps have been executed for the plurality of transmission modes chosen in a predetermined order, an actual transmission mode based on detected peak temporal positions.

10. The digital broadcast receiving method according to claim 9, wherein the digital signal is based on a Digital Audio Broadcasting scheme.

* * * * *